Figure 1:
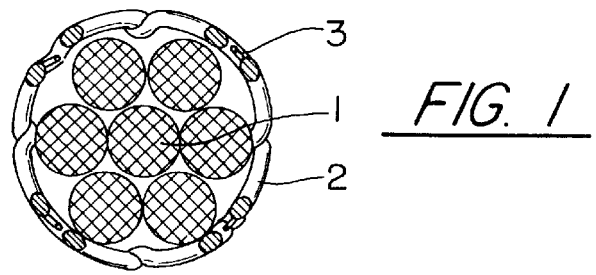

United States Patent [19]
Nilsson

[11] Patent Number: 5,957,434
[45] Date of Patent: *Sep. 28, 1999

[54] ELECTRIC FENCE DEVICE

[75] Inventor: Kjell Nilsson, Tibro, Sweden

[73] Assignee: Fred Nordberg, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,000

[22] PCT Filed: Sep. 8, 1995

[86] PCT No.: PCT/SE95/01012

§ 371 Date: Jun. 13, 1997

§ 102(e) Date: Jun. 13, 1997

[87] PCT Pub. No.: WO96/08140

PCT Pub. Date: Mar. 21, 1996

[30] Foreign Application Priority Data

Sep. 15, 1994 [SE] Sweden ................................ 9403088

[51] Int. Cl.⁶ .............................. A01K 3/00; E04H 17/10
[52] U.S. Cl. ................................. 256/10; 256/45
[58] Field of Search ......................... 256/10, 45

[56] References Cited

U.S. PATENT DOCUMENTS

| 3,291,897 | 12/1966 | Bramley | 256/10 X |
| 4,077,611 | 3/1978 | Wilson | 256/10 |
| 4,845,317 | 7/1989 | Wilson, Jr. | 256/10 X |

FOREIGN PATENT DOCUMENTS

| 483295 | 9/1974 | Australia . |
| 43720/85 | 4/1986 | Australia . |
| B-32565/89 | 4/1990 | Australia . |
| B-77049/91 | 8/1991 | Australia . |
| 57779/94 | 10/1994 | Australia . |
| 653698 | 10/1994 | Australia ................................ 256/10 |
| 44 02 144 | 9/1994 | Germany . |
| WO82/04378 | 12/1982 | WIPO . |

Primary Examiner—Anthony Knight
Assistant Examiner—Alison Pickard
Attorney, Agent, or Firm—Quarles & Brady

[57] ABSTRACT

An electric fence has a series of posts connected by an elastically-stretchable, electrically-conductive string to form an enclosure for animals. The string has a unique structure which is comprised of electrically conductive and electrically nonconductive threads intertwined around a rubber core material. The threads are braided in such a way that the string may be substantially stretched without the braided threads severing. The elastically-stretchable construction prevents the string from breaking when moving animals collide with the electrified string.

6 Claims, 1 Drawing Sheet

ELECTRIC FENCE DEVICE

Electric fences for enclosed pasture-land are previously known and appreciated for being simple and effective. They consist of a grounded mains- or battery-operated pulse generator for high voltage and low power and, connected thereto, a smooth metallic wire which is carried by insulating poles so as to surround the enclosed pasture-land. At first contact with the wire the domestic animals learn that it gives an unpleasant electric shock and thereafter avoid subsequent contact. To date simple stainless metallic wire has been used as wire material, in more sophisticated applications woven into a thin ribbon, which makes it more visible. The previously known type of electric fences have however, a considerable disadvantage. Young domestic animals which have not yet come into contact with the electric fence often approach it with such a speed that they are not restricted by the electric shock before the wire has already been torn off by their rush. The same situation applies to wild animals striving to pass the fence and not being aware of its effect. This way openings in the fence will occur and the cattle will scatter before the owner has observed the damage. The animals may then destroy valuable cultivations and cause work and trouble for the owner. The invention is a safe and economic solution to this and other problems. It is mainly characterized in that one or more electrically conductive wires are associated with an elastic material in such a way that the wires and the material together form a considerably but restricted and elastically stretchable string, which is electrically conductive at least on parts of its surface, and which together with the poles comprise the enclosure.

Figure 2:
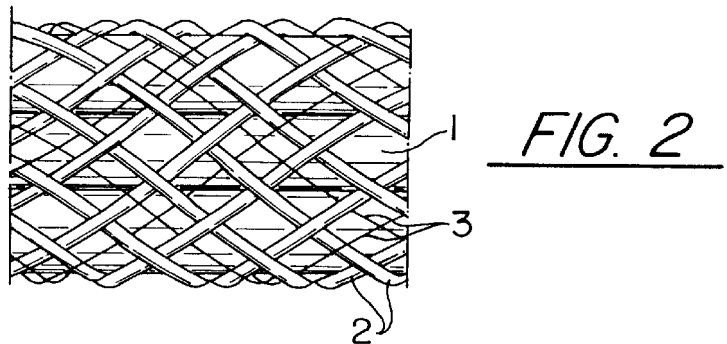
Figure 3:
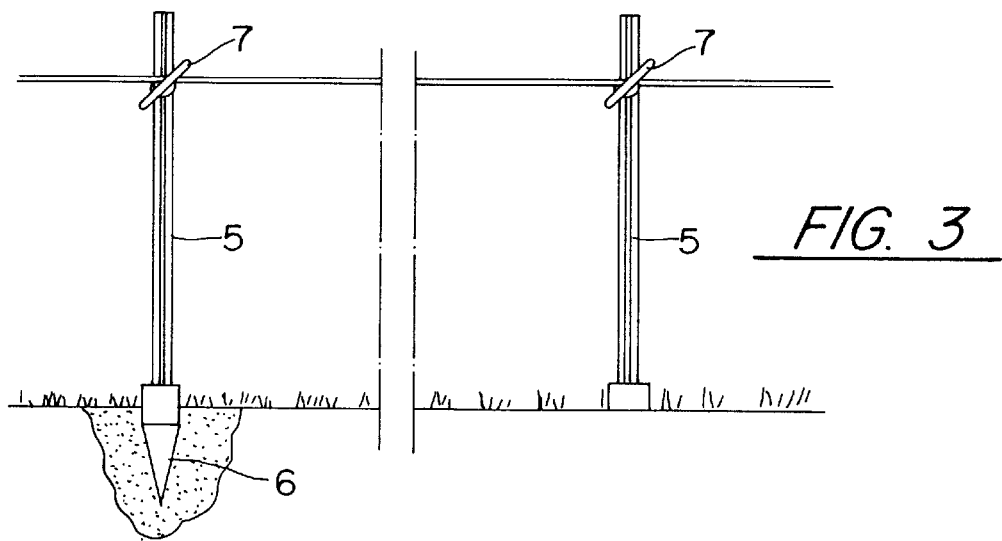
Figure 4:
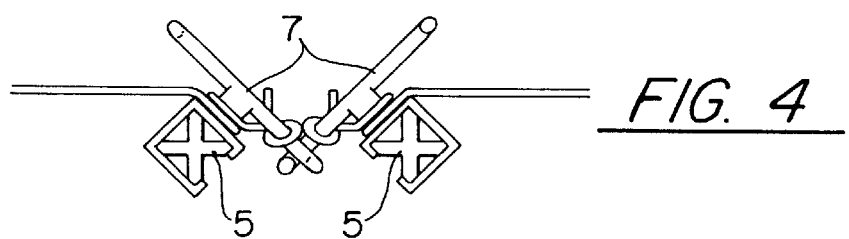

The invention will now be described by way of an embodiment according to the annexed drawing, wherein FIG. 1 shows a section of the string FIG. 2 shows the string in a side view FIG. 3 shows a portion of the enclosure FIG. 4 shows a portion of the enclosure in a horizontal section.

According to FIG. 1 an elastic and electrically conductive string is formed around a synthetic rubber core 1 which preferably is divided into several treads, an envelope of tubular braided plastic threads 2 and a number of metal threads 3 included in the braid. The plastic material is preferably a high quality polyamide, e.g. one being known under the commercial denomination 6006, and is treated against UV-radiation degradation. The metallic thread is comprised of stainless steel with a diameter of 0.15–0.3 mm. The tubular braid allows the string to be stretched out to the length where the plastic threads 2 lie against each other in an almost longitudinal direction and it is dimensioned such with respect to the core 1 that the latter thereby is stretched to about two times its length in the state of rest. The outer diameter of the string is about 4 mm in its state of rest. A string which is formed in such a way is electrically conductive by the metallic threads being braided into its surface and is elastically stretchable because of the association between the rubber core and the braided envelope, but the stretchability is restricted by the lengths of the plastic threads. In order to secure the association between the core and the envelope, the string should be provided with a knot near all free ends. The properties of the string makes it ideal for replacing previously used metallic wires and ribbons in electric fences. It is thereby preferably hung on a post according to FIG. 3 which is comprised of a piece of a thin X-profile 5 of carbon fibre reinforced plastic material and which is provided with a pointed end 6 for pressing down into the ground and a movable attachment means 7 for the string. The attachment means 7 has the same shape as a boat anchor and is positioned obliquely with respect to the profile 5 in order to allow it to be hooked together with a similar attachment means of a neighbouring post of the same type as is illustrated on FIG. 4. The purpose of this is to provide the easiest way of arranging an easily opened place in the fence. The strings which are tied around the respective attachment means contact each other by this hooking together and thereby provide electrically conductive connection. If the post carrying the upper attachment means is slightly pressed down into the ground, it is simple to simultaneously pull it out from the ground and from the mutual connection between the attachment means so as to open the fence. Since both the profile 5 and the attachment means 7 are made from electrically insulating materials, the post may be gripped and lifted simply by the hands.

When mounting the fence the string is stretched to about ¾ of its possible length and is successively attached to the previously mounted posts, which are placed 15–20 m apart, by winding it one turn around the attachment means 7. By the fence being mounted this way the risk of it being run down by rushing animals is eliminated because its stretchability gives the animals time to slow down under the influence of the electric shocks from the string. The animal is not injured and the string will stretch itself straight again when the animal changes direction. The considerably better visibility of the string compared to a simple metal wire also reduces the risk of the animals running on to it. This may be enhanced by using plastic threads in several different colours in the envelope of the string.

Even if the above described embodiment of an elastic string is the most qualified for the intended use, the scope of this invention also encloses several other embodiments. In its most simple form it is a rubber string which by mixing or impregnation with electrically conductive material is provided with a sufficient conductivity for the high voltage electrical pulses also on the surface. In another embodiment very thin threads of metal are mixed with equally thin threads of synthetic fibres and spun according to the method known from the knitwear industry such as to result in a so called tricot string. Such a string has a considerable elastic stretchability and may be twisted together to the thickness and strength necessary for electric fences. Alternatively such a string may be used for spinning around a rubber core. Moreover, a smooth steel wire which is wound into a helical spring and surrounds a rubber core may form the desired string.

Naturally all mentioned embodiments of elastic strings may be used in combination with other kinds of posts and attachments than the ones mentioned above.

I claim:

1. An electric fence device including a generator for transmitting high voltage electric pulses through an electrically conductive enclosure, comprising:

an elastically-stretchable string having an elastic member;

at least one electrically-conductive member combined with said elastic member to form an elastically-stretchable string having an outer surface which is at least partly electrically conductive;

a plurality of posts, said elastically-stretchable string being attached to said posts and defining said enclosure; and, a restricting thread means having a first orientation relative to said elastic member when said elastically stretchable string is attached to said posts and having a second orientation relative to said elastic member as said elastic member is stretched, said second orientation approaching a substantially longitudinal alignment as said elastic member is progressively more stretched, whereby, upon impact with a moving animal, said elastically-stretchable string deflects sufficiently to prevent it from breaking while avoiding excessive stretching.

2. An electric fence device as recited in claim 1, wherein said elastically-stretchable string comprises at least one electrically conductive thread intertwined with at least one electrically nonconductive plastic thread, said conductive and nonconductive threads being arranged as a tubular braid surrounding a rubber core, wherein the length of said tubular braid in an unstretched state is about one half of the length of said tubular braid in a fully-stretched state.

3. An electric fence device as recited in claim 2, further comprising movable anchor-shaped attachment means connected to said posts, said anchor-shaped attachment means for attaching said elastically-stretchable string to said posts, and said anchor-shaped attachment means configured for attachment to one another.

4. An electric fence device as recited in claim 1, wherein said restrictive thread means and said electrically conductive member are knitted into a tricot string.

5. An electric fence device as recited in claim 4, wherein said tricot string is spun around a rubber core.

6. An electric fence device as recited in claim 1, further comprising movable anchor-shaped attachment means connected to said posts, said anchor-shaped attachment means for attaching said elastically-stretchable string to said posts, and said anchor-shaped attachment means configured for attachment to one another.

\* \* \* \* \*